United States Patent [19]
Mellin et al.

[11] Patent Number: 5,964,079
[45] Date of Patent: Oct. 12, 1999

[54] ROTARY CUTTERBAR HOUSING MODULES HAVING ANGLED SIDES

[75] Inventors: Michael James Mellin; John Gregory Peterson; Stephen Kenneth Parsens, all of Ottumwa, Iowa; Matthew Jay Mentzer, Gray, France

[73] Assignee: Deere & Company, Moline, Ill.

[21] Appl. No.: 09/034,495

[22] Filed: Mar. 4, 1998

[51] Int. Cl.⁶ .................................................. A01B 34/66
[52] U.S. Cl. ............................... 56/13.6; 56/6; 74/421 R; 74/606 R
[58] Field of Search ........................... 56/6, 13.6, DIG. 6, 56/255, 295, DIG. 4; 74/606 R, 421 R, 413, 665 GA; 52/591.1, 591.5, 582.1; 285/325; 403/333, 334

[56] References Cited

U.S. PATENT DOCUMENTS

| | | |
|---|---|---|
| 4,947,629 | 8/1990 | Ermacora et al. ...................... 56/13.6 |
| 5,012,635 | 5/1991 | Walters et al. . |
| 5,111,664 | 5/1992 | Van der Lely ............................. 56/6 X |
| 5,715,662 | 2/1998 | Walters ......................................... 56/6 |
| 5,715,663 | 2/1998 | Getz ............................................. 56/6 |

*Primary Examiner*—Robert E. Pezzuto

[57] ABSTRACT

A rotary cutterbar housing is constructed of a plurality of modules mounted in side-to-side relationship with the opposite sides of each module being planar and being secured in face-to-face engagement. A spur gear train is located within the housing and includes at least one gear in each module which is meshed with a spur gear of an adjacent module so that portions of the teeth of the spur gear associated with one of the modules extends a short distance into the other module, and vice-versa. The opposite sides of the modules are parallel to each other and are inclined relative to vertical such that a module between two other modules can be unbolted from them and removed without requiring the other modules to be moved in order to provide clearance for the protruding portions of the gear teeth.

4 Claims, 2 Drawing Sheets

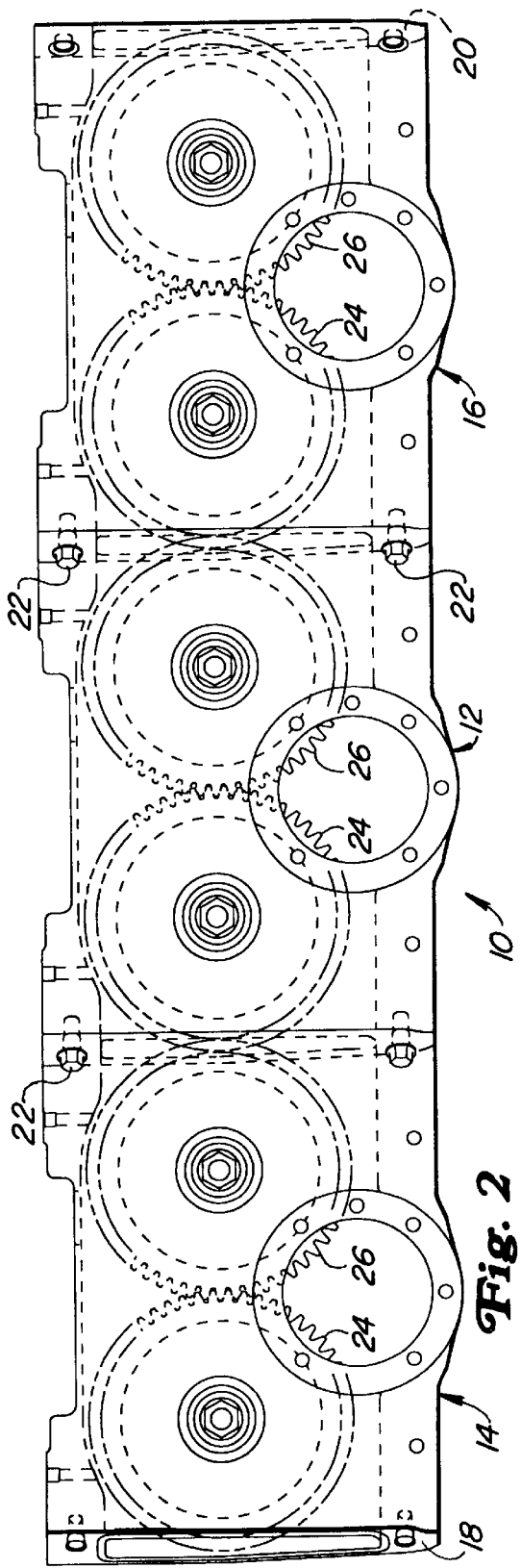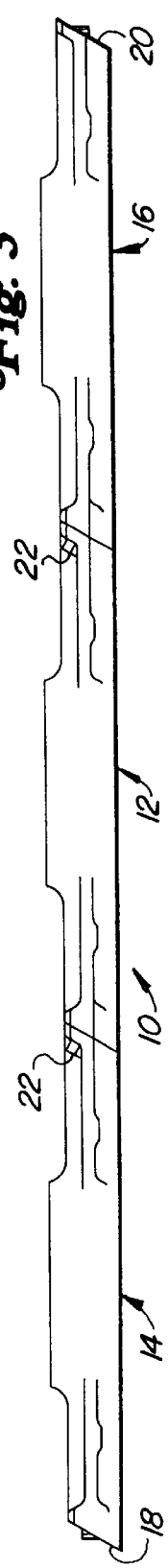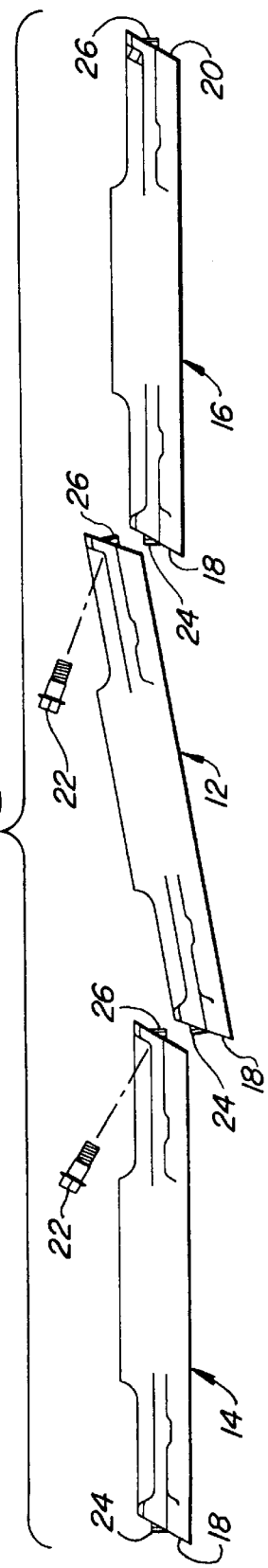

5,964,079

ROTARY CUTTERBAR HOUSING MODULES HAVING ANGLED SIDES

BACKGROUND OF THE INVENTION

The present invention relates to rotary mower cutterbars and more specifically relates to modular gear housings for such cutterbars.

U.S. Pat. No. 5,012,635 issued to Walters et al. on May 7, 1991 discloses a rotary mower having a gear housing constructed of identical, low profile modules. Each module contains a pair of meshed spur-type idler gears, and a pinion gear meshed with one of the idler gears. The pinion gear is mounted to or forms part of the cutter unit drive shaft. The modules have vertical planar sides which are placed in face-to-face engagement with each other and bolted together to form a cutterbar of a desired length. When bolted together, the spur gears of one module each mesh with the adjacent spur gear of the adjacent module with the pitch line of the meshed spur gears of the adjacent modules being located along the plane of separation, or the interface of the side faces of the adjacent modules.

The above-described patented modular cutterbar has the drawback that the vertical sides of the modules do not allow removal of an individual module, which is between two other modules, for repair without removing all modules to one side of the module in need of repair. This is because there is not sufficient clearance for permitting the meshed idler gears at the interfaces of the module to be removed and the adjacent modules to be shifted out of mesh and free of the adjacent modules.

SUMMARY OF THE INVENTION

According to the present invention there is provided an improved modular cutterbar for a rotary mower, and, more specifically, there is provided a modular cutterbar which represents an improvement over that disclosed in U.S. Pat. No. 5,012,635.

A broad object of the invention is to provide a modular cutterbar, of the type described above, having modules constructed such that a module located between two other modules may be easily removed for replacement or service without disturbing any modules to one or the other side or both sides of the module being removed.

A more specific object of the invention is to provide a rotary mower cutterbar constructed of a plurality of side-to-side mounted modules having angled parallel sides so that a module to be removed from between two other modules of the cutterbar may be unbolted from the adjacent modules and rotated such that the spur gears at the opposite sides of the module being removed clears the housings of the adjacent modules.

These and other objects will become apparent from a reading of the ensuing description together with the appended drawings.

BRIEF DESCRIPTION OF THE DRAWINGS

FIG. 2 is a top plan view of the gear housing modules shown in FIG. 1.

FIG. 3 is a front elevational view of the gear housing modules shown in FIG. 2.

FIG. 4 is a view like FIG. 3 but showing the middle module in a position for removal from the other two modules.

DESCRIPTION OF THE PREFERRED EMBODIMENT

Figure 1:
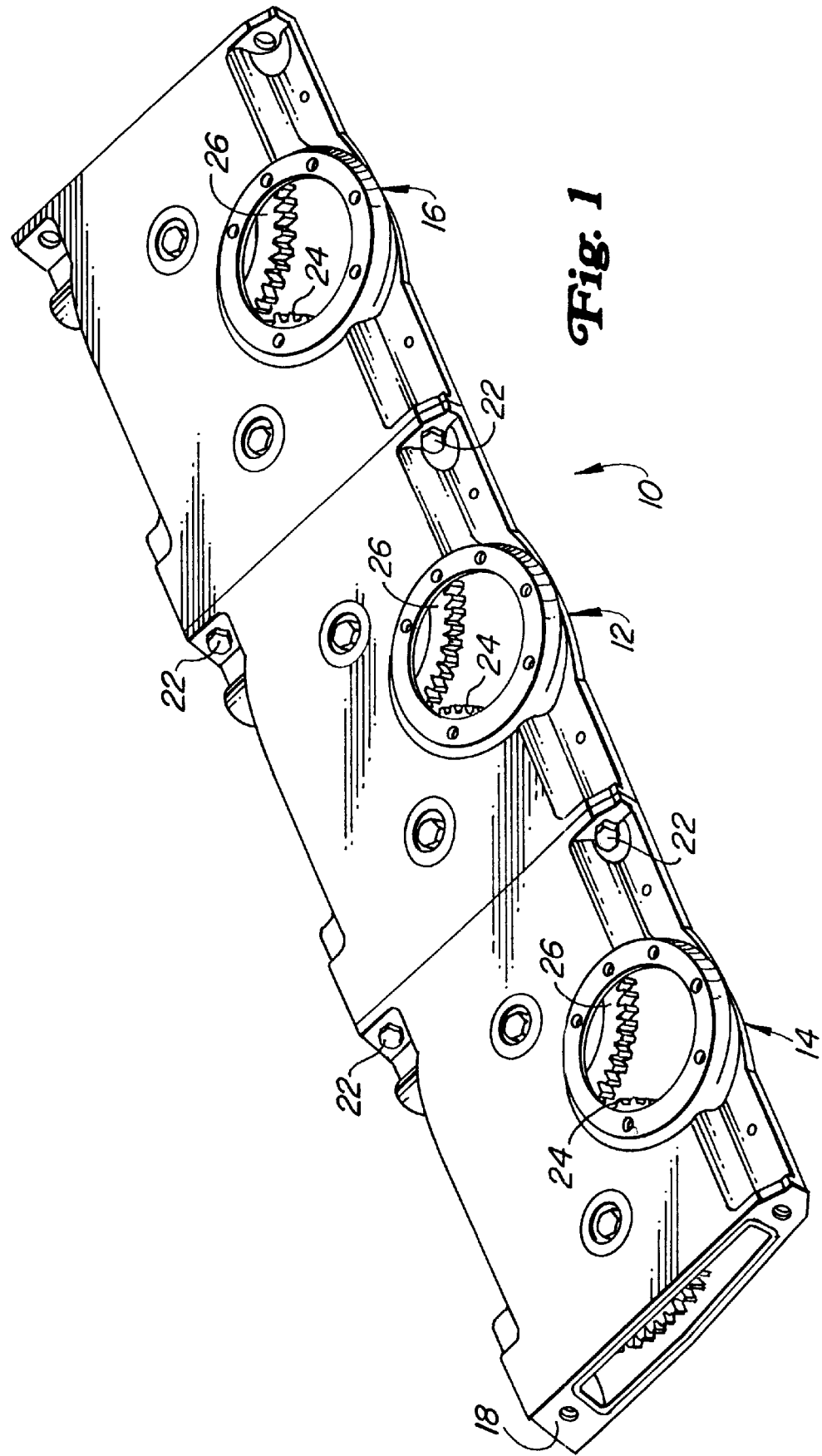
FIG. 1 is a schematic, right front perspective view of three gear housing modules, of a rotary mower modular cutterbar, constructed in accordance with the principles of the present invention and containing intermeshed spur-type idler gears.

Preliminarily, its is noted that the terms right- and left-hand are made with respect to an observer standing behind the structure being described and facing in the direction of forward travel.

Referring now to FIGS. 1–4, there is shown a portion of a rotary or disc mower cutterbar gear housing 10 comprising three identical modules including a middle module 12 located between modules 14 and 16 respectively at its right- and left- hand sides. Each of the modules 12, 14 and 16 includes right-and left-hand parallel sides 18 and 20, with the right- and left-hand sides 18 and 20 of the middle module 12 being respectively bolted, as by respective pairs of stud bolts 22, to the left-hand side 20 of the module 14 and to the right-hand side 18 of the module 16. As can best be seen in FIGS. 3 and 4, the parallel sides 18 and 20 are planar and each is angled from vertical by approximately 30°. This angle may vary, as explained below. The bolts of each pair of stud bolts 22 are respectively located at front and rear side locations of the modules and are received in respective slanted holes extending perpendicular through the left-hand sides 20 and are screwed into threaded through bores provided in the right-hand sides 18 so as to be aligned with the slanted holes when the sides 18 and 20 are positioned for being clamped together by the bolts 22. A stiffener beam, not shown would normally be bolted across the rear of the modules 12, 14 and 16.

As shown in FIGS. 1 and 2, each of the housing modules 12, 14, and 16 is in the form of a flat or low profile tube. Mounted in each module are right- and left-hand spur-type idler gears 24 and 26 which are meshed with each other, and with the right-hand gear 24 of the middle module 12 being meshed with the left-hand gear 26 of the right hand module 14 and with the left-hand gear 26 of the middle module being meshed with the right-hand gear 24 of the left-hand module 16. It is to be noted that the teeth of the gears 24 and 26 of each of the modules 12, 14 and 16 respectively extend beyond the planes of the sides 18 and 20, with a line tangent to the pitch circles of the meshed teeth of the adjacent modules lying in the planes of the interfaces of the clamped together sides 18 and 20 of the adjacent modules.

Referring now to FIG. 4, the middle module 12 is shown unbolted from the adjacent modules 14 and 16 and rotated counterclockwise about a fore-and-aft axis such that the gear teeth projecting from the right-hand side of the module 12 are moved down and free from the gear teeth projecting from the left-hand side of the module 14 while the gear teeth projecting from the left-hand side of the module 12 are moved up and free from the gear teeth projecting from the right-hand side of the module 16.

Thus it will be appreciated that the slanted sides of the modules 12, 14 and 16 permits the module 12 to be unbolted from the stiffener beam and the modules 14 and 16 and then removed without disturbing either of the modules 14 and 16. The angle at which the sides are slanted is chosen such that a vertical, fore-and-aft plane through the outer extremity of the side will be outwardly of the teeth projecting from that side. Also taken into consideration is the fact that the holes and through bores for receiving the bolts 22 need to be at an angle which will assure sufficient metal for tight clamping while being at right angles to the interface of the sides being clamped together. Accordingly, angles of from about 20° to 40° from the vertical would be satisfactory with about 30° from the vertical being preferred. Further, while it is preferred that the slanted sides be parallel to each other so that all of the modules are identical, it is possible to make one set of modules with sides that converge downwardly and another set with sides that converge upwardly, and to mount the two sets of modules in alternating fashion across the length of the cutterbar. When using modules constructed in this fashion, it is not necessary to rotate a module being removed from between two other modules since disengagement may be accomplished by moving the module to be removed vertically relative to the modules at its opposite sides.

We claim:

1. In an elongate rotary cutterbar gear housing constructed of a plurality of side-to-side connected modules and including a first module located between second and third modules, each module having parallel, planar sides and the gear housing containing gearing including at least a first pair of idler gears mounted in said first housing and meshed with each other and respectively with second and third idler gears respectively mounted in said second and third modules, the meshed first pair of idler gears of said first module and the respective second and third idler gears of the second and third modules having respective pitch circles that are tangent to a line that is located in respective planes of interfaces of engaged sides of said second and third modules with opposite sides of said first module, whereby the teeth of said first pair of idler gears respectively extend into the second and third modules, and the teeth of each of said second and third idler gears extend into the first module, the improvement comprising: said planar sides of each module being angled from the vertical a distance sufficient for allowing said first module to be moved vertically away from said second and third modules.

2. The gear housing defined in claim 1 wherein said planar sides make an angle in the range of from about 20 to 40 degrees relative to vertical.

3. A module adapted for forming part of an elongate gear housing of a disc mower including a series of like modules bolted together in side-by-side relationship with each other, comprising: a flat tubular structure having mounting areas designed for receiving a pair of spur-type idler gears located inside the structure, with the gears having teeth projecting slightly beyond opposite planar sides of said structure; said opposite planar sides being parallel to each other and being angled relative to vertical such that, when a series of the modules are bolted together to form a gear housing, modules in the middle of the housing can be removed without removing any of the other modules.

4. The module as set forth in claim 3 wherein said planar sides make an angle in the range of from about 20 to 40 degrees relative to vertical.

* * * * *